Nov. 15, 1932.   L. CONSTANTIN ET AL   1,887,802
WIND MOTOR
Filed March 12, 1931    3 Sheets-Sheet 1
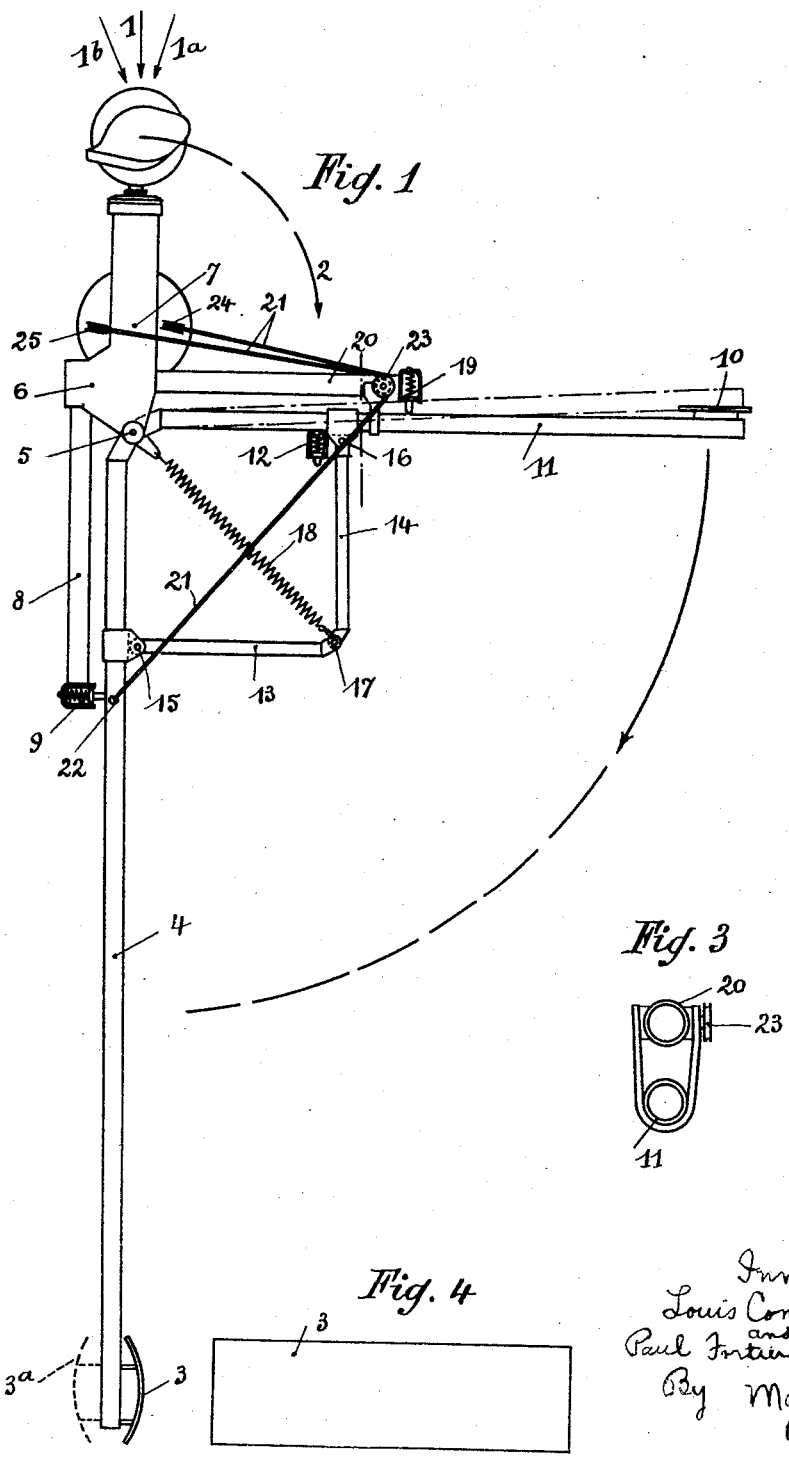

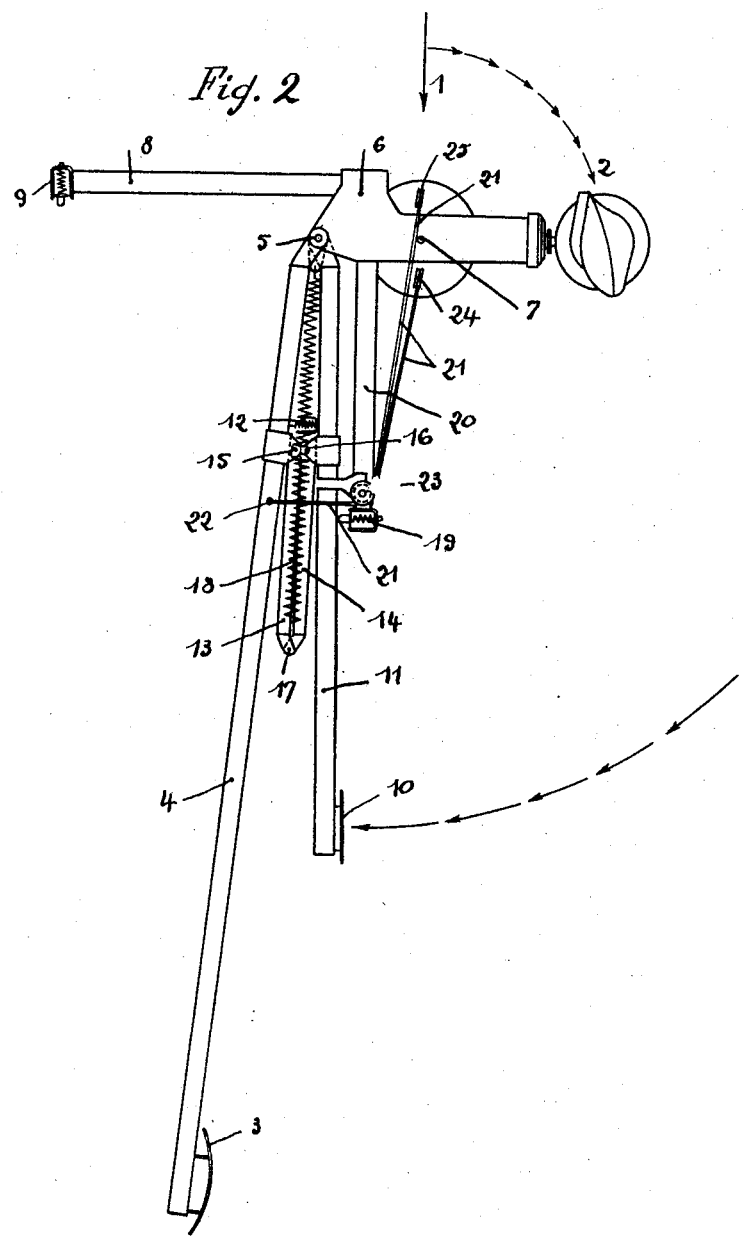

Patented Nov. 15, 1932

1,887,802

UNITED STATES PATENT OFFICE

LOUIS CONSTANTIN, OF PARIS, AND PAUL FORTIER-BEAULIEU, OF ROANNE, FRANCE

WIND MOTOR

Application filed March 12, 1931, Serial No. 522,048, and in France March 14, 1930.

Our invention relates to improvements in automatic orienting and effacing devices for wind motors.

The essential feature of our invenion consists in that the orienting rudder and the effacing blade are mounted at the ends of arms that are articulated to the movable head of the main wind motor and drive said movable head through suitable abutments. Suitable means such as a spring or a counterweight are provided for exerting a force along the diagonal of an articulated lozenge two sides of which are formed by said arms in such manner that said arms are kept at right angles to each other for a normal speed of the wind.

Furthermore, in order to increase the power of the orienting rudder, it is advantageous to mount said rudder on the movable head of the wind motor in such manner that it may rotate under the action of a change in the direction of the wind and thus be imparted a greater thrust.

A preferred embodiment of our invention will be hereinafter described with reference to the appended drawings, given merely by way of example, and in which:

Fig. 1 is diagrammatic plan view of the device in position of normal working;

Fig. 2 is a diagrammatic plan view of the same device when the wind motor is wholly effaced;

Fig. 3 is a detail view showing the connection between the frame of the effacing device and a shock absorbing arm;

Fig. 4 is a side view of the orienting rudder;

Figure 5:
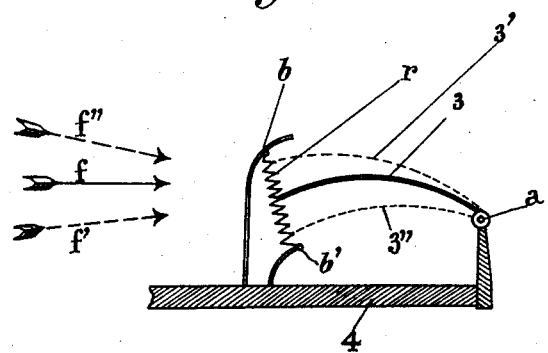
Figs. 5 and 6 are diagrammatical views of an articulated orienting rudder and its controlling means corresponding to two different embodiments.

In these figures, 1 is the direction of the wind, 2 is the path of the center of the propeller of the wind motor, and 3 is the orienting rudder. Said rudder 3 is supported by an arm 4 pivotally mounted at 5 on the movable head 6 of the wind motor. Said movable head is adapted to rotate about vertical axis 7 and carries a rigid arm 8 on which arm 4 is adapted to exert a thrust from the left to the right through the intermediary of shock absorber 9.

The effacing blade 10, which may be plane or rounded, is carried by arm 11, which is pivotally mounted at 5 on the rotatable head and is provided with a shock absorber 12. Arms 4 and 11 are connected by two other arms 13 and 14, themselves articulated at 15, 16 and 17, the whole forming an articulated lozenge the diagonal 18 of which consists of a spring or the cable that serves to support a counterweight.

Arm 11 butts through a shock absorber 19 against a rigid arm 20 rigidly connected to movable head 6. Said arm 11 is adapted to drive arm 20 and therefore movable head 6 through a connection which is shown in detail on Fig. 3.

Two cables 21, secured in 22 to arm 4 and passing over pulleys 23, 24 and 25, make it possible, by pulling them from the ground, to move arm 4 toward arm 11 and thus to produce effacement at will.

Rudder 3 differs from the rudders that have been used up to this day by the following features:

First, this rudder has not, as usual, its longitudinal dimension placed in the direction of the wind, but at right angles to that direction. In other words said rudder is elongated in the vertical direction.

Furthermore, its section is not a straight line but a line approximating a circular arc. In other words said rubber consists of a portion of a cylindrical surface the directrix of which is a circular arc located in a horizontal plane while its generatrix is a vertical straight line.

This circular arc may be disposed as shown in 3 when it is desired to balance up to a certain degree the thrust of the wind on effacing blade 10. Or else it may be disposed as shown in 3a in dotted lines, when it is desired to add the thrust of the wind on said rudder to that exerted on blade 10 in order to balance up to a certain point the disorienting torque produced by the impeller through its action on the multiplying gearing.

The cylindrical surface thus defined, or any other surface approximating it, has the well known advantage over the plane surface usually employed that the correcting torque which is automatically produced every time the wind shifts its direction may be up to four times greater. Whence an improved efficiency, and the possibility of substantially lightening the surface.

The mechanism automatically operates as follows:

It will be supposed at first that the direction of the wind passes from 1 to 1a. The equilibrium will be destroyed and rudder 3 will tend to move from the right to the left, thus driving through shock absorber 9 and arm 8 the remainder of the mechanism about common axis 7. This movement will stop when a new state of equilibrium is established.

It will now be supposed that the direction of the wind passes from 1 to 1b. If its velocity has not increased, there is no reason why the articulated lozenge should be deformed. Therefore, rudder 3 will tend to rotate from the left to the right and will accordingly drive arm 11, which, acting through shock absorber 19 on arm 20, will in turn drive the whole movable mechanism until a new state of equilibrium is reached.

It will now be supposed that the velocity of the wind increases without its direction being changed. The position of rudder 3 will be but slightly modified, if at all. The thrust of the wind on blade 10 will produce a deformation of the articulated lozenge and an elongation of spring 18 until, as shown in Fig. 2, the whole having rotated about axis 7, the plane of rotation of the impeller is parallel to the direction of the wind. The effacement will then be complete.

It should be noted here that when the velocity of the wind will again decrease, shock absorber 12 will tend to annihilate the wedging effect which, otherwise, might take place.

The arrangement of spring 18 according to the invention has two very important advantages over the arrangements used up to this time:

(a) The stroke of the spring may be chosen as long as it is desired;

(b) The tensile stress is always directed along the axis of the spring.

The use of the shock absorbers will make the working of the whole more progressive and will preserve the support and the mechanism from the very violent shocks that take place with the ordinary devices in rough weather.

In Fig. 5, rudder 3, which consists of a portion of a cylindrical surface and is shown in plan view, is connected to support 4 secured to the movable head, not through a system of rigid connections, but through an articulation a located back of the extreme position of the center of thrust. (According to experiments conducted at the Eiffel laboratory, the position of these centers of thrust is located at a distance from the entering edge which varies between 100% and 50% of the length of the chord when the angle of incidence varies between $-7°$ and $+10°$). Two stops $b$ and $b'$ limit the oscillation of the system, and springs $r$ of suitable strength absorb the shocks and determine, with respect to the velocity of the wind, the position of surface 3 with respect to stops $b$ and $b'$.

It will be readily understood that, under these conditions, if the whole is in a state of equilibrium under the action of a wind having a direction $f$, a deflection of said wind toward $f'$ will cause an angular displacement of surface 3 toward position $3'$, the angle of incidence will increase and the orienting force, which is about proportional to this angle of incidence, will also increase. Once the new position of equilibrium is reached, the surface will again take its original position with respect to stops $b$ and $b'$ if the velocity of the wind has not changed in the meantime. It should however be pointed out that any change in the velocity of the wind will somewhat modify this position of equilibrium, according to the strength of springs $b$ and $b'$. Likewise, if the direction of the wind is $f''$, surface 3 will tend to occupy position $3''$ until the new orientation is effected.

We therefore provide in that way an orienting rudder which is extremely powerful, chiefly for small variations in the direction of the wind and for small velocities of the wind, which is the very effect that is looked for.

Figure 6:
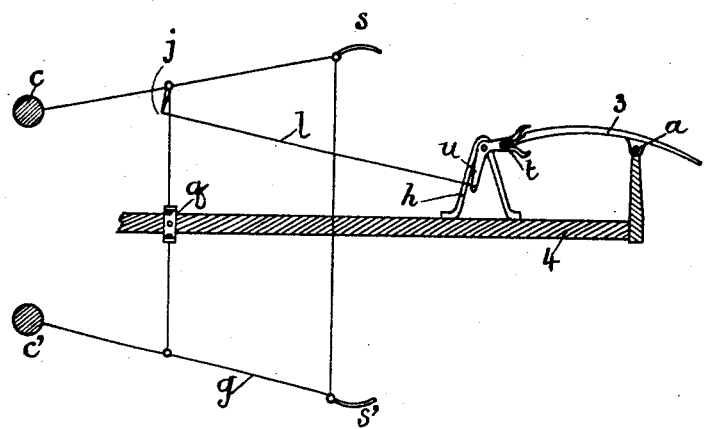

Fig. 6 shows another way of increasing the power of rudder 3. In this case, articulation $a$ is located very close to the mean position of the center of thrust, so that the own angular displacements of the rudder may take place with the minimum actuating force.

These angular displacements are controlled by a windvane $g$, preferably a windvane of the type comprising orienting surfaces mounted on an articulated quadrilateral and provided with counterweights $c$ and $c'$, said windvane being rigidly connected at $q$ with the rudder carrying arm 4. It is known that the characteristic feature of this type of windvane is that, when the direction of the wind rotates for instance through an angle of one degree, surfaces S and S' are imparted a much more important angular displacement if the lengths on which they are mounted are the trapezium on which they are mounted are suitably chosen. It results therefrom that by connecting one of the nonparallel sides of the trapezium to the oscillating rudder through an arm $j$, a rod $l$, and a bent lever $u$ provided with a fork $t$ and carried by a support $h$, an amplified angular displacement of rudder 3 will correspond to any deflection of the direction of the wind, thus increasing the power of the orienting action of this rudder.

While we have in the above description endeavored to disclose what we believe to be an efficient and practical embodiment of our invention, it is to be understood that the invention is not limited by the specific details as shown, but that it is subject to many and all structural variations which may express the invention and at the same time come within the scope of the appended claims.

What we claim is:

1. An orienting and effacing device for wind motors having a rotatable head carrying a wind motor which comprises in combination, an effacing blade, an arm for supporting said effacing blade, direct means for angularly connecting said blade supporting arm to said rotatable head, an orienting rudder consisting of a single substantially cylindrical surface having vertical generatrices, an arm for supporting said rudder pivotally mounted on said rotatable head, said cylindrical surface being dissymmetrically disposed with respect to said last mentioned arm, a stop carried by said head adapted to prevent said last mentioned arm from making an angle of more than 90 degrees with the blade supporting arm, two other arms articulated to each other and to said blade supporting and rudder carrying arms so as to form an articulated lozenge, and resilient means for normally maintaining said arms at right angles to each other.

2. An orienting and effacing device for wind motors having a rotatable head carrying a wind motor which comprises in combination, an effacing blade, an arm for supporting said effacing blade, direct means for angularly connecting said blade supporting arm to said rotatable head, an orienting rudder consisting of a substantially cylindrical surface having vertical generatrices and whose greater dimension is vertically disposed, an arm for supporting said rudder pivotally mounted on said rotatable head, said cylindrical surface being dissymmetrically disposed with respect to said last mentioned arm, a stop carried by said head adapted to prevent said last mentioned arm from making an angle of more than 90 degrees with the blade supporting arm, two other arms articulated to each other and to said blade supporting and rudder carrying arms so as to form an articulated lozenge, and resilient means for normally maintaining said arms at right angles to each other.

3. An orienting and effacing device for wind motors having a rotatable head carrying a wind motor which comprises in combination an effacing blade, an arm for supporting said effacing blade, elastic means for angularly connecting said arm to said rotatable head, an orienting rudder consisting of a substantially cylindrical surface having vertical generatrices and whose greater dimension is vertically disposed, an arm for supporting said rudder pivotally mounted on said rotatable head, said cylindrical surface being dissymmetrically disposed with respect to said last mentioned arm, an arm rigidly mounted on said rotatable head, an elastic stop on said last mentioned arm adapted to prevent said rudder carrying arm from making an angle of more than 90 degrees with the blade supporting arm, two other arms articulated to each other and to the blade supporting and rudder carrying arms so as to form an articulated lozenge, and a spring adapted to connect opposite apexes of said lozenge for normally maintaining said arms at right angles to each other.

4. An orienting and effacing device for wind motors having a rotatable head carrying a wind motor which comprises in combination an effacing blade, an arm for supporting said effacing blade, elastic means for angularly connecting said arm to said rotatable head, another arm pivotally mounted on said rotatable head, said cylindrical surface being dissymmetrically disposed with respect to said last mentioned arm, a stop carried by said rotatable head adapted to prevent said last mentioned arm from making an angle of more than 90 degrees with the blade supporting arm, a cylindrical rudder pivotally mounted on one side of said pivoting arm, two stops for limiting the rotation of said rudder with respect to said arm, two other arms articulated to each other and to the blade supporting and rudder carrying arms so as to form an articulated lozenge, and a spring adapted to connect opposite apexes of said lozenge for normally maintaining said arms at right angles to each other.

5. An orienting and effacing device for wind motors having a rotatable head carrying a wind motor which comprises in combination an effacing blade, an arm for supporting said effacing blade, elastic means for connecting said arm to said rotatable head, another arm pivotally mounted to said rotatable head, a stop carried by said rotatable head adapted to prevent said last mentioned arm from making an angle of more than 90 degrees with the blade supporting arm, a cylindrical rudder pivotally mounted on said pivoting arm, two stops for limiting the rotation of said rudder with respect to said last mentioned arm, two springs interposed between each of said stops and the pivoting rudder respectively, two other arms articulated to each other and to the blade supporting and rudder carrying arms so as to form an articulated lozenge, and a spring adapted to connect opposite apexes of said lozenge for normally maintaining said arms at right angles to each other.

6. An orienting and effecting device for wind motors having a rotatable head carrying a wind motor which comprises in combination an effacing blade, an arm for supporting said effacing blade, elastic means for connecting said arm to said rotatable head, another arm pivotally mounted on said rotatable head, a stop carried by said rotatable head adapted to prevent said last mentioned arm from making an angle of more than 90 degrees with the blade supporting arm, a cylindrical rudder pivotally mounted on said pivoting arm, a wind-vane mounted on said rudder carrying arm adapted to control the angular position of said rudder, said wind vane comprising orienting surfaces mounted on an articulated quadrilateral, two other arms articulated to each other and to the blade supporting and rudder carrying arms so as to form an articulated lozenge, and a spring adapted to connect opposite apexes of said lozenge for normally maintaining said arms at right angles to each other.

7. An orienting and effacing device for wind motors having a rotatable head carrying said wind motor, which comprises in combination, an effacing blade, an arm for supporting said effacing blade, elastic means for angularly connecting said arm to said rotatable head, another arm pivotally mounted on said rotatable head, a stop carried by said rotatable head adapted to prevent said last mentioned arm from making an angle of more than 90° with the blade supporting arm, a bracket rigidly secured to the free end of said pivoting arm at right angles thereto, a cylindrical rudder having generatrices pivoted to the end of said bracket, means for controlling the angular position of said cylindrical rudder with respect to said pivoting arm, two stops for limiting the rotation of said rudder with respect to said arm, two other arms articulated to each other and to the blade supporting and rudder carrying arms so as to form an articulated lozenge, and a spring adapted to connect opposite apexes of said lozenge for normally maintaining said arms at right angles to each other.

In testimony whereof we have signed this specification.

LOUIS CONSTANTIN.
PAUL FORTIER-BEAULIEU.